(12) United States Patent
Medvinsky et al.

(10) Patent No.: US 12,169,547 B2
(45) Date of Patent: Dec. 17, 2024

(54) COMMUNICATIONS DEVICE, METHOD AND COMMUNICATIONS SYSTEM FOR MANAGING AN AUTHENTICATION EVENT

(71) Applicant: GRABTAXI HOLDINGS PTE. LTD., Singapore (SG)

(72) Inventors: Gennady Medvinsky, Seattle, WA (US); Surya Anil Lingamallu, Seattle, WA (US); Alexander Yukhanov, Seattle, WA (US)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

(21) Appl. No.: 17/793,946

(22) PCT Filed: Feb. 11, 2020

(86) PCT No.: PCT/SG2020/050064
§ 371 (c)(1),
(2) Date: Jul. 20, 2022

(87) PCT Pub. No.: WO2021/162629
PCT Pub. Date: Aug. 19, 2021

(65) Prior Publication Data
US 2023/0046380 A1    Feb. 16, 2023

(51) Int. Cl.
*H04L 29/06* (2006.01)
*G06F 21/44* (2013.01)
(Continued)

(52) U.S. Cl.
CPC ............ *G06F 21/44* (2013.01); *G06F 21/602* (2013.01); *H04L 9/0894* (2013.01); *G06F 2221/2111* (2013.01); *G06F 2221/2133* (2013.01)

(58) Field of Classification Search
CPC . G06F 21/44; G06F 21/602; G06F 2221/2111
See application file for complete search history.

(56) References Cited

U.S. PATENT DOCUMENTS 8,584,219 B1 * 11/2013 Toole .................. H04L 69/24
 726/25
2008/0182592 A1 * 7/2008 Cha .................... H04W 12/08
 455/456.3

(Continued)

OTHER PUBLICATIONS

International Search Report for Application No. PCT/SG2020/050064, mailed Aug. 3, 2020, (4 pages).
(Continued)

*Primary Examiner* — Jason K Gee
(74) *Attorney, Agent, or Firm* — Buckley, Maschoff & Talwalkar LLC

(57) ABSTRACT

A communications device for managing an authentication event is provided, which is configured to generate location data indicative of a geolocation associated with the communications device, retrieve, from a key that is obfuscated and stored in the communications device, the key, sign the location data with the retrieved key, and transmit request data to a communications server apparatus for requesting the authentication event, the request data comprising the signed location data. A method and a communications system for managing an authentication event are also provided.

18 Claims, 3 Drawing Sheets

(51) Int. Cl.
    *G06F 21/60*     (2013.01)
    *H04L 9/08*     (2006.01)

(56)           References Cited

U.S. PATENT DOCUMENTS

| | | |
|---|---|---|
| 2009/0316900 A1 | 12/2009 | Qiu et al. |
| 2013/0117572 A1* | 5/2013 | Berczes ............... H04W 12/10 |
| | | 713/178 |
| 2014/0082713 A1* | 3/2014 | Markel ................. H04L 63/105 |
| | | 726/7 |
| 2014/0351886 A1 | 11/2014 | Edge et al. |
| 2016/0103983 A1 | 4/2016 | Brown et al. |

OTHER PUBLICATIONS

Written Opinion for Application No. PCT/SG2020/050064, mailed Aug. 3, 2020, (5 pages).
Scott, et al. A Location, Based Encryption Technique and Some of Its Applications, Proceedings of the 2003 National Technical Meeting of the Institute of Navigation, Anaheim, CA, Jan. 24, 2003, pp. 734-740.

* cited by examiner

COMMUNICATIONS DEVICE, METHOD AND COMMUNICATIONS SYSTEM FOR MANAGING AN AUTHENTICATION EVENT

TECHNICAL FIELD

The invention relates generally to the field of communications. One aspect of the invention relates to a communications device for managing an authentication event. Other aspects of the invention relate to a method for managing an authentication event, and a communications system for managing an authentication event.

One aspect of the invention has particular, but not exclusive, application to managing an authentication event that is related to a (geo)location of a communications device or the user thereof requesting the authentication event.

BACKGROUND

Security mechanisms are generally implemented in computing systems nowadays, for example, to prevent system abuse, to deter attacks, etc.

A CAPTCHA (an acronym for "completely automated public Turing test to tell computers and humans apart") is a mechanism used in computing systems to prevent system abuse by automated tools. CAPTCHA can be used by, for example, providers of transport-related services, to prevent computerized tools from creating passenger's accounts, from conducting denial of service attacks, from taking over real passenger accounts and other malicious actions.

There are multiple types of CAPTCHA challenges used today, for example, text-based CAPTCHA (when the user is asked to type in an obfuscated set of letters), image-based CAPTCHA (when a user is asked to pick an image/images matching a given text description), sound-based CAPTCHA (when a user is asked to type in a word which was pronounced by the client's device), etc.

An example of a text-based challenge is shown in FIG. 3 which illustrates an example of a log in page or screen 380 where there is a text-based CAPTCHA 382 and a field 384 for a user or respondent to input an answer.

The effectiveness of a CAPTCHA solution is defined by how simple it is for a real person to answer the question, the cost of developing/buying an automated solution (solver) designed to solve this particular captcha and the expense of operating the solver. Advances in Artificial Intelligence over the last decade have degraded the effectiveness of CAPTCHAs as a means to safeguard higher value resources.

There is therefore need for techniques that address one or more problems associated with the prior art.

SUMMARY

Aspects of the invention are as set out in the independent claims. Some optional features are defined in the dependent claims.

Implementation of the techniques disclosed herein may provide significant technical advantages. The techniques may provide for inclusion of information or data corresponding to a geolocation associated with a communications device in request data transmitted by the communications device, for example, to a communications server apparatus, to request for an authentication event. With the knowledge of the geolocation of the communications device or the user thereof, the resulting authentication event presented to the communications device or the user thereof may be related to (or specific to) the geolocation. In this way, information required from the user to the authentication event may not be available from or in the authentication event itself, and the response that is required from the user is information that is available at or associated with the (geo)location of the user using the communications device.

The techniques disclosed herein may provide for signing the geolocation payload or the location data indicative of the geolocation with a key that is obfuscated and stored in the communications device. This may provide a security mechanism that prevents or at least, minimise the risk of unauthorised or malicious users gaining access to the key.

Signing with the key also provides security as to verify that the data associated with the geolocation, as transmitted by the communications device, is genuine or representative of the (geo)location of the communications device or the user thereof.

In at least some implementations, the techniques disclosed herein may provide for the communications device to perform obfuscation of the key and storing the obfuscated key in the communications device.

In at least some implementations, the techniques disclosed herein may enable determination of whether the communications device is rooted.

In an exemplary implementation, the functionality of the techniques disclosed herein may be implemented in software running on a handheld communications device, such as a mobile phone. The software which implements the functionality of the techniques disclosed herein may be contained in an "App"—a computer program, or computer program product—which the user has downloaded from an online store. When running on the, for example, user's mobile telephone, the hardware features of the mobile telephone may be used to implement the functionality described below, such as using the mobile telephone's transceiver components to establish the secure communications channel managing an authentication event.

BRIEF DESCRIPTION OF THE DRAWINGS

The invention will now be described, by way of example only, and with reference to the accompanying drawings in which.

DETAILED DESCRIPTION

Various embodiments may provide techniques for increasing the diversity of authentication events or challenges (e.g., CAPTCHA challenges) using device geolocation. A CAPTCHA challenge is a type of challenge-response test.

The present techniques may address one or more problems associated with the prior art via periodic introduction of different challenge types. This may increase CAPTCHA efficiency as it requires malicious parties to develop solvers for additional types of challenges.

Current CAPTCHA systems use challenges which contain all required information for being answered. For example, the challenge may be in the form of "Select all pictures with road signs." and a set of pictures may be displayed, which includes all the necessary information for the text and image recognition engines to succeed in responding to the challenge.

Various techniques disclosed herein may introduce one or more challenges which require information that may be unavailable in the question/answer. For example, a challenge that takes into account the user's current location or derived information (e.g., time of day, weather, surroundings, etc) may be provided.

The techniques disclosed herein may increase the challenge (e.g., CAPTCHA challenge) diversity by utilizing device's geolocation (estimation of the real-world geographic location of the user's device). The techniques disclosed herein may be applied in relation to any types of authentication events or challenges, including, for example, CAPTCHA challenges.

As non-limiting examples, there may be provided techniques for generating and presenting challenges (e.g., CAPTCHA challenges) to a user by utilising the geolocation (estimation of the real-world geographic location) of the user's device, thereby increasing the diversity of the (CAPTCHA) challenges. Such challenges require, from the user, information or response that may be unavailable in the question/answer, for example, a challenge that takes into account the user's current location or derived information. Some examples of geolocation-based challenges may include one or more questions about the time of the day, the weather, and the surroundings, questions about the country the user is in or the closest city name, challenges containing map images of nearby locations (real and/or fake), challenges containing images of famous places located near the estimated device location, etc.

Figure 1:
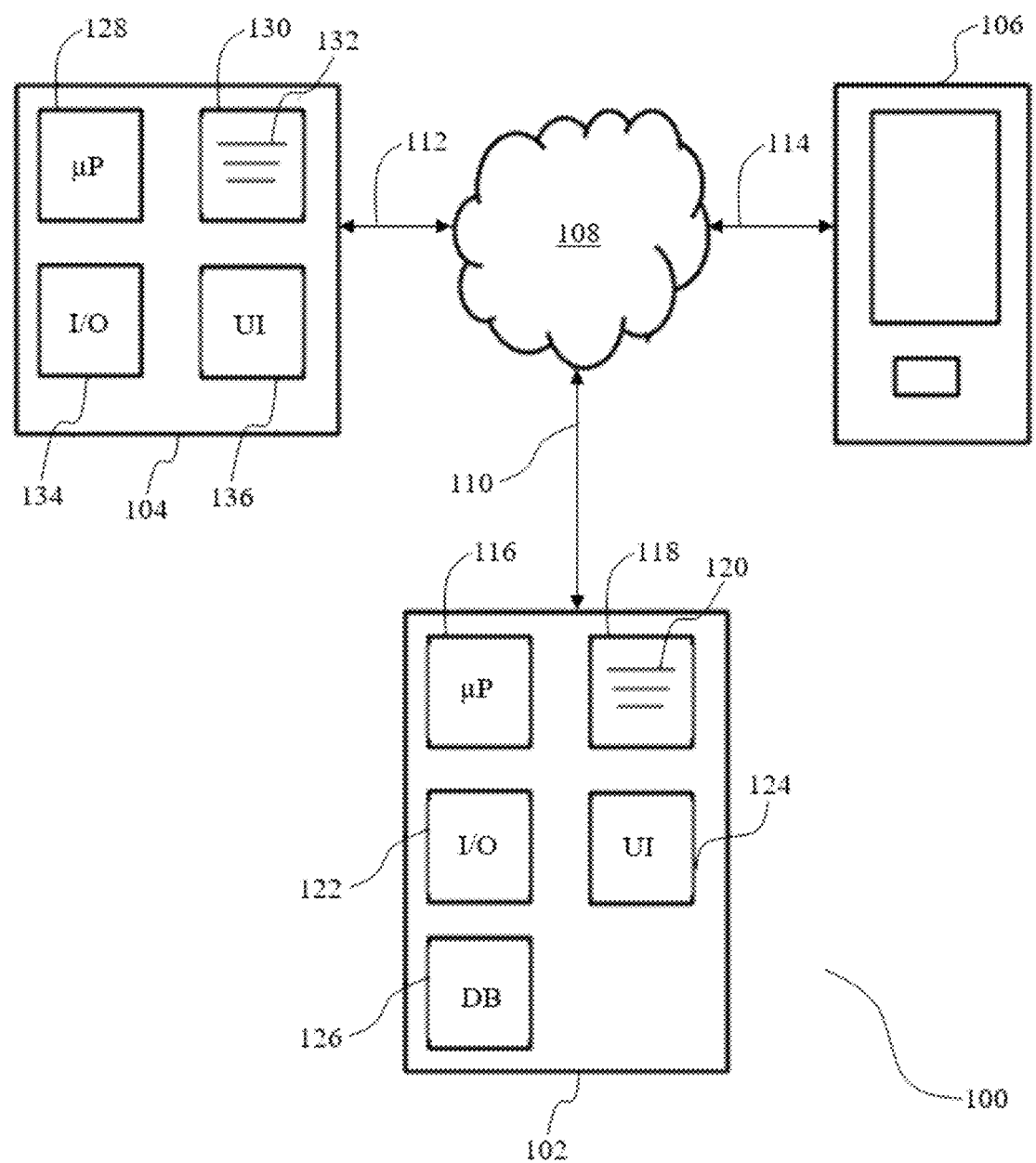
FIG. 1 is a schematic block diagram illustrating an exemplary communications system involving a communications server apparatus.

Referring first to FIG. 1, a communications system 100 is illustrated, which may be applicable in various embodiments or techniques. The communications system 100 may be for managing an authentication event.

The communications system 100 includes a communications server apparatus 102, a first user (or client) communications device 104 and a second user (or client) communications device 106. These devices 102, 104, 106 are connected in or to the communications network 108 (for example, the Internet) through respective communications links 110, 112, 114 implementing, for example, internet communications protocols. The communications devices 104, 106 may be able to communicate through other communications networks, such as public switched telephone networks (PSTN networks), including mobile cellular communications networks, but these are omitted from FIG. 1 for the sake of clarity. It should be appreciated that there may be one or more other communications devices similar to the devices 104, 106.

The communications server apparatus 102 may be a single server as illustrated schematically in FIG. 1, or have the functionality performed by the communications server apparatus 102 distributed across multiple server components. In the example of FIG. 1, the communications server apparatus 102 may include a number of individual components including, but not limited to, one or more microprocessors (µP) 116, a memory 118 (e.g., a volatile memory such as a RAM (random access memory)) for the loading of executable instructions 120, the executable instructions 120 defining the functionality the server apparatus 102 carries out under control of the processor 116. The communications server apparatus 102 may also include an input/output (I/O) module 122 allowing the server apparatus 102 to communicate over the communications network 108. User interface (UI) 124 is provided for user control and may include, for example, one or more computing peripheral devices such as display monitors, computer keyboards and the like. The communications server apparatus 102 may also include a database (DB) 126, the purpose of which will become readily apparent from the following discussion.

The communications server apparatus 102 may be for managing an authentication event.

The user communications device 104 may include a number of individual components including, but not limited to, one or more microprocessors (µP) 128, a memory 130 (e.g., a volatile memory such as a RAM) for the loading of executable instructions 132, the executable instructions 132 defining the functionality the user communications device 104 carries out under control of the processor 128. User communications device 104 also includes an input/output (I/O) module 134 allowing the user communications device 104 to communicate over the communications network 108. A user interface (UI) 136 is provided for user control. If the user communications device 104 is, say, a smart phone or tablet device, the user interface 136 may have a touch panel display as is prevalent in many smart phone and other handheld devices. Alternatively, if the user communications device 104 is, say, a desktop or laptop computer, the user interface may have, for example, one or more computing peripheral devices such as display monitors, computer keyboards and the like.

The user communications device 106 may be, for example, a smart phone or tablet device with the same or a similar hardware architecture to that of the user communications device 104.

The user communications device 104 and/or the user communications device 106 may be for managing an authentication event.

Figure 2A:
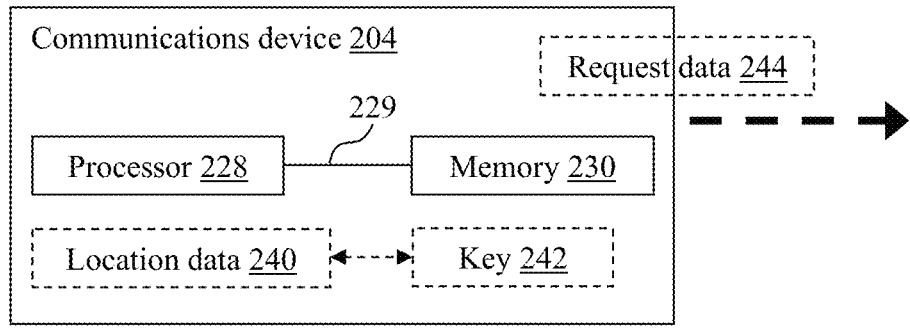
FIG. 2A shows a schematic block diagram illustrating a communications device for managing an authentication event.

FIG. 2A shows a schematic block diagram illustrating a communications device 204 for managing an authentication event. The communications device 204 includes a processor 228 and a memory 230, where the communications device 204 is configured, under control of the processor 228 to execute instructions in the memory 230 to, generate location data 240 indicative of a geolocation associated with the communications device 204, retrieve, from a key that is obfuscated and stored in the communications device 204, the key 242, sign the location data 240 with the retrieved key 242, and transmit request data 244 to a communications server apparatus for requesting the authentication event, the request data 244 having the signed location data. The processor 228 and the memory 230 may be coupled to each other (as represented by the line 229), e.g., physically coupled and/or electrically coupled. The processor 228 may be as described in the context of the processor 128 (FIG. 1) and/or the memory 230 may be as described in the context of the memory 130 (FIG. 1).

In other words, a (user) communications device 204 may be provided. The communications device 204 may generate location data 240 indicative of a geolocation associated with the communications device 204 or the user thereof. In this way, the location data 240 may include data associated with the geolocation. Geolocation or geolocation data may be obtained by means of one or more sensors (e.g., GPS sensor) of the communications device 204, the communications (e.g., Wifi) network that the communications device 204 is connected to, cellular network information associated with the communications device 204, etc.

The term "geolocation" may refer to the physical location itself or may mean the identification or estimation of the real-world geographic location of an object. Geolocation may include data indicative of the geographic position or physical location, which may range in size, for example, referring to a specific location defined by latitude and longitude, to an area, a city, a region, a state, a country, etc. Data associated with geolocation may include location coordinates. The data may include, for example, one or more of latitude, longitude, altitude.

The communications device 204 may further obtain or recover a key 242 from its obfuscated state or condition as stored or kept in the communications device 204. This may mean that one or more obfuscation techniques are employed to cause the key 242 as stored in the communications device 204 to be obfuscated, e.g., to become unintelligible or incomprehensible or unidentifiable. Recovering or retrieving the key 242 may include an un-obfuscation process, i.e., to un-obfuscate the stored key that is or has been obfuscated. Accordingly, as compared to the key 242 that is stored in an obfuscated state, the key 242, as retrieved, is in an un-obfuscated state or condition. In other words, the retrieved key is in a form or state that is identifiable or intelligible. When retrieving the key 242, (only) the part(s) comprised in the key 242 may be obtained or retrieved to form the key 242. As may be appreciated, obfuscation and un-obfuscation of the key 242 are associated with the communications device 204, or take place at the communications device 204.

The use of obfuscation as a security mechanism in the techniques disclosed herein may prevent or deter a malicious user (or an attacker) from sending location data of his own choosing.

The term "key" as described herein may include one or more sets of data or bits. As a non-limiting example, the size of the key may be 128-bit, but it should be appreciated that other smaller or bigger sizes may be suitable. As a non-limiting example, a password may be the key. As another non-limiting example, the key may include hexadecimal numbers.

In various embodiments, the key 242 may be a static key, meaning that the same key may be re-used for the purpose of a plurality of authentication events.

In various embodiments, the communications device 204 may generate the key 242 that is to be obfuscated, and consequently, also the key 242 that is to be retrieved.

In various embodiments, the key 242 may be a private key that is known only to the communications device 204 or the relevant program or Application (App) thereof. At the communications server apparatus, there may be a public key that is complementary to the private key 242. There is therefore, a key pair having the private key 242 and the public key that match one another, which may be used for verification purposes. The communications device 204 may generate the complementary public key and transmit the public key to the communications server apparatus.

However, it should be appreciated that it is possible that the key 242 may be a dynamic key, for example, having a value that may be dynamically changed or updated. For a dynamic private key, a new public key may be generated each time the private key is changed and then made available to the communications server apparatus.

The communications device 204 may further sign the location data (or location payload) 240 with the retrieved key 242. The "signing" of the location data 240 with the key 242 may include processing the location data 240 with the retrieved key 242 to output the signed location data.

The communications device 204 may further transmit request data 244, which includes the location data 240 that has been signed with the key 242 that is retrieved, to a communications server apparatus for requesting or to request for the authentication event from the communications server apparatus.

With information regarding the geolocation associated with the communications device 204 provided with the request data 244, the authentication event may be provided taking into consideration the location data 240, and, therefore, may include or may be a location-based authentication event. This may mean that the authentication event may require a response from the user of the communications device 204 that is related to the location of or associated with the communications device 204, or that is related to the vicinity or surroundings of the communications device 204, or the geographical area (e.g., city, state, country, etc.) that the communications device 204 is in. The response that is required may include, but not limited to, the location itself, nearby landmark, information that may be derived based on the location, such as the weather, the time of day, etc.

In various embodiments, an authentication event may be required in order to access one or more services, and a proper response to the authentication event is required to allow the user of the communications device 204 access to the service(s). The services may include, but not limited to, registrations of user accounts, banking services, transportation services, payment services, booking or reservation services, etc.

In various embodiments, the authentication event may include a challenge-response authentication event (or test), e.g., CAPTCHA ("completely automated public Turing test to tell computers and humans apart"). Other non-limiting examples of authentication events or challenge-response may include two-factor authentication, one time password, etc.

Prior to retrieving the key 242, the communications device 204 may obfuscate the key 242, and may store the obfuscated key in the communications device 204.

The communications device may further include application code to obfuscate the key 242, wherein the application code (itself) may be obfuscated.

The communications device may further include application code to retrieve the key 242, wherein the application code (itself) may be obfuscated.

The communications device may further include application code to sign the location data 240 with the retrieved key 242, wherein the application code (itself) may be obfuscated.

By having the application codes obfuscated, the obfuscation technique(s) that is used and/or the un-obfuscation or retrieval technique(s) used may be unidentifiable to minimise unauthorised access to the key 242.

The application code to obfuscate the key 242, the application code to retrieve the key 242 and the application code to sign the location data 240 with the retrieved key 242 may be the same application code or part of the same application code, or may be two or three different application codes.

The communications device 204 may further determine (or check) whether the communications device 204 is rooted. This may, for example, be carried out prior to any one of generating the location data 240, retrieving the key 242, signing the location data 240 with the retrieved key 242, and transmitting the request data 244.

The term "rooted" as used herein may be applicable across different operating systems to mean there has been modification made that allow privileged access or root access in or over the operating system or subsystem(s). This means that the communications device 204 disclosed herein may include any communications device running any operating systems, including the Android operating system, and non-Android operating systems.

When a communications device is rooted or is a rooted device, this may mean that the communications device may be a modified device that allows root access or confer certain privileges with, for example, the ability to change certain system-level applications and settings, and other inaccessible operations, which normal users generally do not engage in. As such, a rooted device may be indicative that the user of the communications device is potentially a user with malicious intents.

As a non-limiting example, if the communications device 204 is determined to be rooted, any one or more of generating the location data, retrieving the key, signing the location data with the retrieved key, and transmitting the request data may be prevented from being carried out.

The communications device 204 may receive data corresponding to the authentication event from the communications server apparatus, the data being generated (e.g., by the communications server apparatus) based on the location data. The data corresponding to the authentication event may include data indicative of a time associated with the geolocation.

In the context of various embodiments, the communications device 204 may include portable and non-portable communications devices. The communications device 204 may include, but not limited to, a smart phone, tablet, handheld/portable communications device, desktop or laptop computer, terminal computer, etc.

Figure 2B:
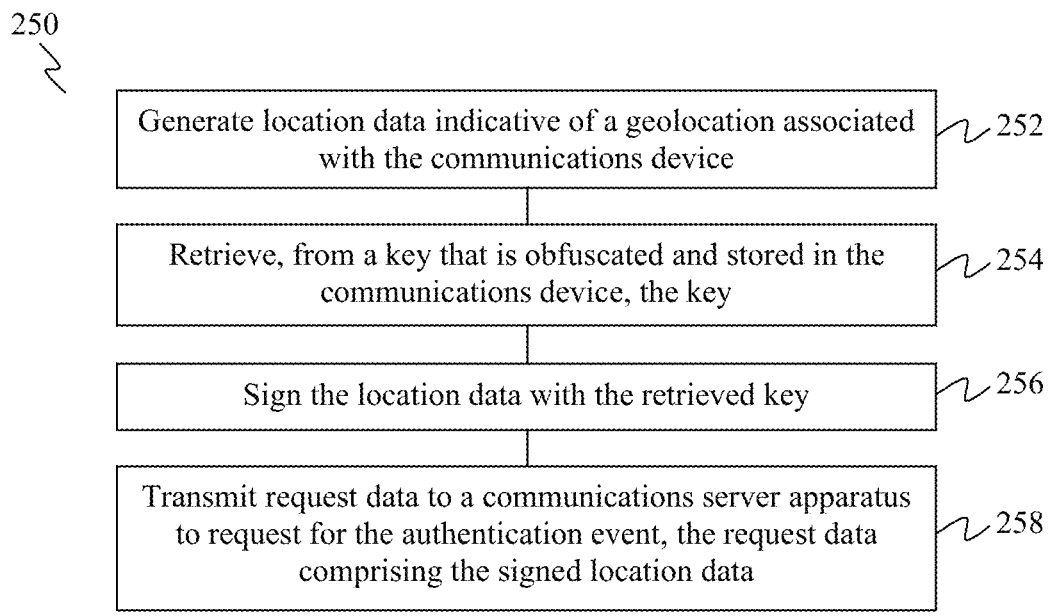
FIG. 2B shows a flow chart illustrating a method performed in a communications device for managing an authentication event.
Figure 3:
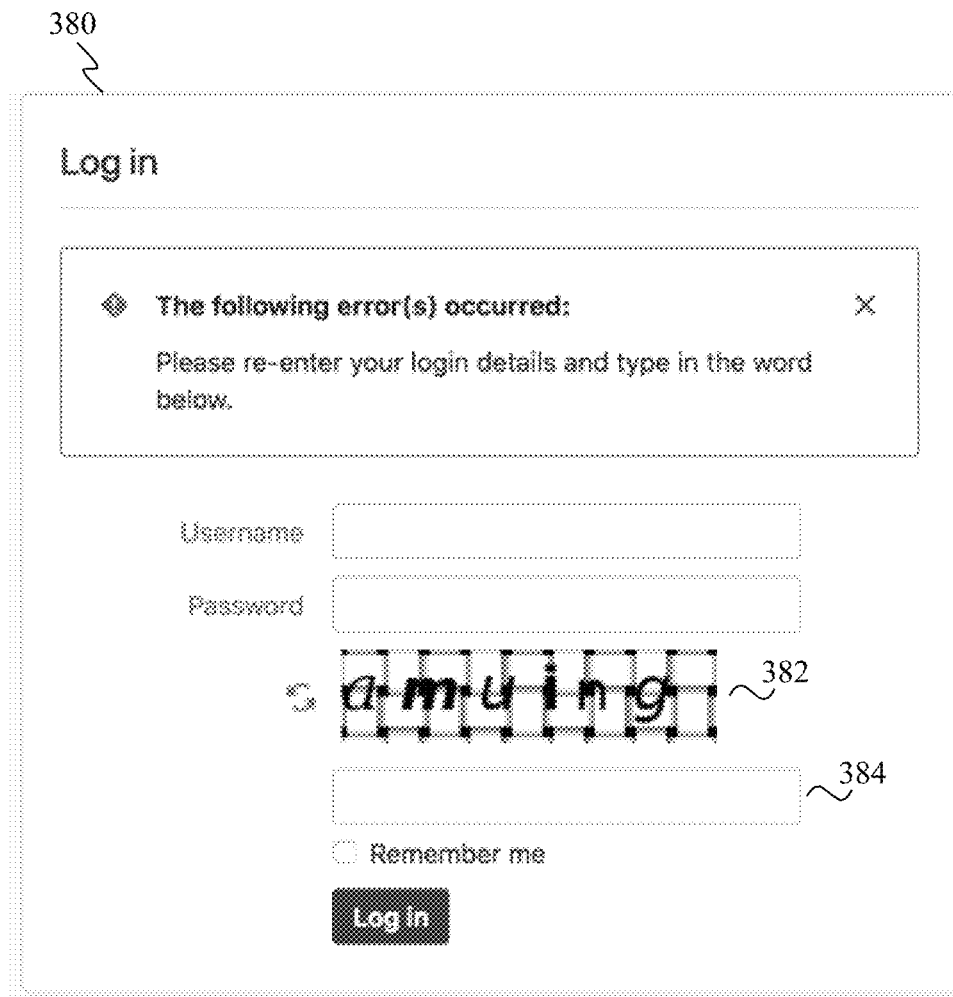
FIG. 3 shows an example of a text-based challenge of the prior art.

FIG. 2B shows a flow chart 250 illustrating a method, performed in a communications device for managing an authentication event, and under control of a processor of the communications device.

At 252, location data indicative of a geolocation associated with the communications device is generated.

At 254, from a key that is obfuscated and stored in the communications device, the key is retrieved.

At 256, the location data is signed with the retrieved key.

At 258, request data is transmitted to a communications server apparatus for requesting the authentication event, the request data having the signed location data.

Prior to retrieving the key, the method may include obfuscating the key, and storing the obfuscated key in the communications device. Obfuscating the key may include processing the key with an application code to obfuscate the key, wherein the application code may be obfuscated.

At 254, retrieving the key may include processing the obfuscated key with an application code to retrieve the key, wherein the application code may be obfuscated.

At 256, signing the location data with the retrieved key may include processing the location data and the retrieved key with an application code to sign the location data with the retrieved key, wherein the application code may be obfuscated.

The method may further include determining whether the communications device is rooted.

The method may further include receiving data corresponding to the authentication event from the communications server apparatus, the data being generated (e.g., by the communications server apparatus) based on the location data. The data corresponding to the authentication event may include data indicative of a time associated with the geolocation.

In the context of various embodiments, the key (e.g., key 242) may be obfuscated by means of one or more of:
 (i) storing data corresponding to the key in a form other than a key or in a form that is unidentifiable as a key,
 (ii) changing the order of the data corresponding to the key,
 (iii) storing the key or data thereof in a memory that is inaccessible to unauthorised users,
 (iv) storing the key or data thereof in random locations in the communications device,
 (v) storing one or more parts of the key or data thereof in different memories or locations in the communications device, and
 (vi) mixing one or more parts of the key or data thereof with other data that is not part of the key.

The above-mentioned obfuscation methods may be applicable to application codes to obfuscate the application codes.

It should be appreciated that descriptions in the context of the communications device 204 may correspondingly be applicable in relation to the method as described in the context of the flow chart 250, and vice versa.

There may also be provided a computer program product having instructions for implementing the method described herein for managing an authentication event.

There may also be provided a computer program having instructions for implementing the method described herein for managing an authentication event.

There may further be provided a non-transitory storage medium storing instructions, which, when executed by a processor, cause the processor to perform the method described herein for managing an authentication event.

Various embodiments may further provide a communications system for managing an authentication event, having a communications server apparatus, at least one user communications device and communications network equipment operable for the communications server apparatus and the at least one user communications device to establish communication with each other therethrough, wherein the at least one user communications device includes a first processor and a first memory, the at least one user communications device being configured, under control of the first processor, to execute first instructions in the first memory to, generate location data indicative of a geolocation associated with the communications device, retrieve, from a key that is obfuscated and stored in the communications device, the key, sign the location data with the retrieved key, and transmit request data for receipt by the communications server apparatus for requesting the authentication event, the request data including the signed location data, and, wherein the communications server apparatus includes a second processor and a second memory, the communications server apparatus being configured, under control of the second processor, to execute second instructions in the second memory to, in response to receiving data indicative of the request data having the signed location data, verify the signed location data using a key that is complementary to the retrieved key, and in response to the verification, generate data corresponding to the authentication event based on the location data, the authentication event requiring a response that is related to the geolocation, and transmit, for receipt by the at least one user communications device, the data corresponding to the authentication event.

Verification may be carried out by checking whether both keys match or are complementary to each other. This may determine whether the key received with the request data, and/or whether the received location data is valid/genuine. The key used by the communications server apparatus may be a public key.

Once verified, the communications server apparatus may access or retrieve the location data, which may be used by the communications server apparatus for generating the data corresponding to the authentication event.

The authentication event may include an authentication challenge (e.g., a challenge-response authentication) that is specific to the location of the communications device or the user thereof based on the geolocation associated with the communications device.

As the response to the authentication event requires information that is related to or corresponds to the geolocation, the authentication event is, therefore, a location-based authentication event. The response that is required may include, but not limited to, information relating to the location itself, nearby landmark, and information that may be derived based on the location, such as the weather, the time of day, etc.

The communications server apparatus may further, in response to receiving identification data indicative of at least one of an identifier of the at least one user communications device (e.g., device ID), an IP address (Internet Protocol address) associated with the at least one user communications device, or a phone number associated with the at least one user communications device, identify the at least one user communications device or the user thereof based on the identification data, and retrieve, from data accessible by the communications server apparatus, data corresponding to the identified user communications device or the identified user thereof. This may provide a more comprehensive profile of the user. The data available or accessible by the communications server apparatus may include historical data associated with the at least one user communications device or the user thereof. The identification data may be transmitted by the communications device as part of the request data or as separate data for receipt by the communications server apparatus.

Information or data on or about users may be stored at the communications server apparatus, and, therefore, may be obtained from the communications server apparatus. When the user of the communications device requesting for the authentication event is identified, data or information relating to the user may be retrieved.

In various embodiments, the at least one user communications device may further receive the data corresponding to the authentication event.

The data corresponding to the authentication event may include data indicative of a time associated with the geolocation.

In the context of various embodiments, the authentication event may be based on a time associated with the geolocation.

In the context of various embodiments, a communications server apparatus as described herein may be a single server, or have the functionality performed by the communications server apparatus distributed across multiple server components.

In the context of various embodiments, an "App" or an "Application" may be installed on a user communications device and may include processor-executable instructions for execution on the device. As a non-limiting example, the request for the authentication event may be carried out via an App, which, for example, may be used to access one or more services.

Various embodiments or techniques will now be further described in detail below.

Various embodiments or techniques may improve the utility of a challenge or authentication event/test, for example, a challenge-response test, e.g., CAPTCHA, by increasing diversity of the challenges by means of geolocation of a user's device. This may mean that one or more challenges that may be presented to a user may be generated or adapted, taking into consideration the geolocation of the user, in a manner that the response to be provided by the user requires knowledge or information related to or associated with the surrounding, or environment, or area in the vicinity corresponding to or according to the geolocation.

Non-limiting examples of how the techniques may be carried out are as below, using CAPTCHA as the example.

A CAPTCHA client may send a challenge request to a CAPTCHA service. The request may include the geolocation information of a device where or through which the CAPTCHA client may be provided or executed. The CAPTCHA client may be used by a user to access or gain access to a service provided by a service provider.

The "CAPTCHA client" refers to a client application that is utilizing CAPTCHA client side functionality, for example, an Application or a web browser that loads a web page (which may include included a javascript library) for performing client side CAPTCHA tasks, for example, rendering CAPTCHA image to an end user, sending user response back to a CAPTCHA service, etc.

The "CAPTCHA service" refers to the server side entity that is responsible for all communication with the CAPTCHA client (i.e., it executes the server side of the protocol with the CAPTCHA client). It may run on a server, for example, it may reside on a machine instance in a cloud service like AWS (Amazon Web Services), Azure, etc.

The geolocation payload may be signed by the CAPTCHA client using an obfuscated private key. This may then be checked by the CAPTCHA service to prevent spoofing attacks. Here, the service side may check if the received information is signed with a key hidden in the client to prevent spoofing attacks.

The CAPTCHA client may be based on a service provider's one or more (app) security modules that may employ one or more code and/or key obfuscation techniques that attest to the service provider's one or more services that the CAPTCHA client is authentic (e.g., unmodified). The client may be deemed to be authentic if the client has access to the key. The CAPTCHA client may be able to detect rooted devices and/or may have one or more safeguards to detect location spoofing. Detection of rooted devices may be by means of boot verification and/or signed binaries, where the program is only allowed to load if signed. If it is unverified, a flag may be raised. Detection of location spoofing may be done at the server side, through verification of the key-pair. The security modules may refer to one or more to software libraries. For example, the security module may be a software module with one or more (specific) API (application programming interface) interfaces used by the CAPTCHA client.

By signing using an obfuscated private key, and/or employing one or more code and/or key obfuscation techniques, various embodiments may include utilization of security mechanism to prevent the attacker from sending location coordinates of his choosing, thus, defeating the difficulty of solving the CAPTCHA. Otherwise, a modified or rooted device could send the location of the attacker's (or malicious user's) choosing, thus making it easier to facilitate answers to location-oriented questions, since the location is of the attacker's choice.

The CAPTCHA service may enrich the geolocation information received from the CAPTCHA client with information obtained on the server side based on, for example, the CAPTCHA client's IP address, the CAPTCHA client's device history, the phone number associated with the user's device (if the device is a communications device, particularly, a phone), etc., so as to form a more complete information profile about the user. This may mean that the geolocation information may be obtained from the CAPTCHA client as part of the challenge request, and when or upon receiving the request, other information about the user that may be available may be included. The CAPTCHA service may then use the information or data or signals obtained to generate text and/or image-based challenges specific to the user's location.

In terms of the client's device history, based on the device ID, for example, it may be possible to look up one or more of the following: any or all requests made from that device in a given timeframe, any or all transactions made from that device in a given time period, the location history when one or more requests were made, etc. In terms of the phone number, based on the number, for example, it may be possible look up which user account currently has that phone number registered, if any. Information corresponding to the user associated with the user account may then be obtained or derived.

In various embodiments, the geolocation based challenges may include (but are not limited to) one or more of:
  a. Question about the time of the day;
  b. Question about the country, closest city name, etc.;
  c. Challenge containing one or more map images of nearby location(s) (real and/or fake);
  d. Challenge containing one or more images of famous place(s) located near the estimated device location.

In the context of various embodiments, obfuscation of the key corresponding to a communications device may include, storing the relevant data corresponding to the key in a form other than a key, changing the order of the data corresponding to the key, storing the key or data thereof in memory, RAM (Random-access memory) or in a component or location that is inaccessible to other parties, storing the key or data thereof in random areas or locations in the communications device, for example, in one or more memories, storing one or more parts of the key or data thereof in different memories or locations in the communications device, avoiding using any information or identifier that identifies the key or data thereof as the key, encoding the key, for example, by mixing one or more parts of the key or data thereof with other data that do not form part of the key, and keeping the key secret in the communications device. The obfuscation techniques described may also be applicable to obfuscation of application codes.

It will be appreciated that the invention has been described by way of example only. Various modifications may be made to the techniques described herein without departing from the spirit and scope of the appended claims. The disclosed techniques comprise techniques which may be provided in a stand-alone manner, or in combination with one another. Therefore, features described with respect to one technique may also be presented in combination with another technique.

The invention claimed is:

1. A communications device for managing an authentication event, comprising a processor and a memory, the communications device being configured, under control of the processor, to execute instructions in the memory to:
  generate location data indicative of a current geolocation associated with the communications device;
  retrieve, from a key that is obfuscated and stored in the communications device, the key;
  sign the location data with the retrieved key;
  transmit request data to a communications server apparatus for requesting the authentication event, the request data comprising the signed location data, the communications server apparatus performing processing using the signed location data to extract the location data and to enrich the location data with derived information including the weather to generate text and/or image-based challenges specific to the location data;
  receive data corresponding to the authentication event from the communications server apparatus, the data being generated based on the location data and the derived information, and including the generated text and/or image-based challenges, wherein information required from a user of the communications device in response is unavailable from the challenges; and
  complete the authentication event by receiving a response from the user of the communications device that is related to the location data and that is responsive to the generated text and/or image-based challenges.

2. The communications device as claimed in claim 1, wherein, prior to retrieving the key, the communications device is configured to:
  obfuscate the key; and
  store the obfuscated key in the communications device.

3. The communications device as claimed in claim 2, further comprising application code to obfuscate the key, wherein the application code is obfuscated.

4. The communications device as claimed in claim 1, further comprising application code to retrieve the key, wherein the application code is obfuscated.

5. The communications device as claimed in claim 1, further configured to determine whether the communications device is rooted.

6. The communications device as claimed in claim 1, wherein the key is obfuscated by means of one or more of:
  (i) storing data corresponding to the key in a form other than a key or in a form that is unidentifiable as a key;
  (ii) changing the order of the data corresponding to the key;
  (iii) storing the key or data thereof in a memory that is inaccessible to unauthorised users;
  (iv) storing the key or data thereof in random locations in the communications device;
  (v) storing one or more parts of the key or data thereof in different memories or locations in the communications device; and
  (vi) mixing one or more parts of the key or data thereof with other data that is not part of the key.

7. The communications device as claimed in claim 1, wherein the data corresponding to the authentication event comprises data indicative of a time associated with the geolocation.

8. A method, performed in a communications device for managing an authentication event, the method comprising, under control of a processor of the communications device:
  generating location data indicative of a current geolocation associated with the communications device;
  retrieving, from a key that is obfuscated and stored in the communications device, the key;

signing the location data with the retrieved key;
transmitting request data to a communications server apparatus for requesting the authentication event, the request data comprising the signed location data, the communication server apparatus performing processing using the signed location data to extract the location data and to enrich the location data with derived information including the weather to generate text and/or image-based challenges specific to the location data;
receiving data corresponding to the authentication event from the communications server apparatus, the data being generated based on the location data and the derived information and including the generated text and/or image-based challenges, wherein information required from a user of the communications device in response is unavailable from the challenges; and
completing the authentication event by receiving a response from the user of the communications device that is related to the location data and that is responsive to the generated text and/or image-based challenges.

9. The method as claimed in claim 8, further comprising, prior to retrieving the key:
obfuscating the key; and
storing the obfuscated key in the communications device.

10. The method as claimed in claim 9, wherein obfuscating the key comprises processing the key with an application code to obfuscate the key, wherein the application code is obfuscated.

11. The method as claimed in claim 8, wherein retrieving the key comprises processing the obfuscated key with an application code to retrieve the key, wherein the application code is obfuscated.

12. The method as claimed in claim 8, further comprising determining whether the communications device is rooted.

13. The method as claimed in claim 8, wherein the key is obfuscated by means of one or more of:
(i) storing data corresponding to the key in a form other than a key or in a form that is unidentifiable as a key;
(ii) changing the order of the data corresponding to the key;
(iii) storing the key or data thereof in a memory that is inaccessible to unauthorised users;
(iv) storing the key or data thereof in random locations in the communications device;
(v) storing one or more parts of the key or data thereof in different memories or locations in the communications device; and
(vi) mixing one or more parts of the key or data thereof with other data that is not part of the key.

14. The method as claimed in claim 8, wherein the data corresponding to the authentication event comprises data indicative of a time associated with the geolocation.

15. A non-transitory storage medium storing instructions, which when executed by a processor cause the processor to perform the method as claimed in claim 8.

16. A communications system for managing an authentication event, comprising a communications server apparatus, at least one user communications device and communications network equipment operable for communications server apparatus and the at least one user communications device to establish communication with each other therethrough,
wherein the at least one user communications device comprises a first processor and a first memory, the at least one user communications device being configured, under control of the first processor, to execute first instructions stored in the first memory to:
generate location data indicative of a current geolocation associated with the communications device;
retrieve, from a key that is obfuscated and stored in the communications device, the key;
sign the location data with the retrieved key; and
transmit request data for receipt by the communications server apparatus for requesting the authentication event, the request data comprising the signed location data; and
wherein the communications server apparatus comprises a second processor and a second memory, the communications server apparatus being configured, under control of the second processor, to execute second instructions stored in the second memory to:
in response to receiving data indicative of the request data comprising the signed location data, verify the signed location data using a key that is complementary to the retrieved key, and
in response to the verification,
generate data corresponding to the authentication event based on the location data by enriching the location data with derived information including the weather to generate text and/or image-based challenges specific to the location data, the authentication event requiring a response that is related to the geolocation and the derived information, and that is responsive to the generated text and/or image-based challenges; and
transmit, for receipt by the at least one user communications device, the data corresponding to the authentication event,
wherein the at least one user communications device is further configured, under control of the first processor, to execute first instruction stored in the memory to:
receive the data corresponding to the authentication event from the communications server apparatus, wherein information required from a user of the communications device in response is unavailable from the challenges; and
complete the authentication event by receiving a response from the user of the user communications device that is related to the location data and that is responsive to the generated text and/or image-based challenges.

17. The communications system as claimed in claim 16, wherein the communications server apparatus is further configured to:
in response to receiving identification data indicative of at least one of an identifier of the at least one user communications device, an IP address associated with the at least one user communications device, or a phone number associated with the at least one user communications device,
identify the at least one user communications device or the user thereof based on the identification data; and
retrieve, from data accessible by the communications server apparatus, data corresponding to the identified user communications device or the identified user thereof.

18. The communications system as claimed in claim 16, wherein the data corresponding to the authentication event comprises data indicative of a time associated with the geolocation.

* * * * *